May 24, 1966  M. SHENKER  3,252,373
HIGH SPEED CATADIOPTRIC OBJECTIVE IN WHICH THREE CORRECTOR
ELEMENTS DEFINE TWO POWER BALANCED AIR LENSES
Filed May 26, 1961  2 Sheets-Sheet 1

INVENTOR
MARTIN SHENKER
BY
ATTORNEYS

United States Patent Office 3,252,373
Patented May 24, 1966

3,252,373
HIGH SPEED CATADIOPTRIC OBJECTIVE IN WHICH THREE CORRECTOR ELEMENTS DEFINE TWO POWER BALANCED AIR LENSES
Martin Shenker, Monsey, N.Y., assignor to Farrand Optical Co., Inc., New York, N.Y., a corporation of New York
Filed May 26, 1961, Ser. No. 112,818
8 Claims. (Cl. 88—57)

The present invention relates to combined mirror and lens objectives or catadioptric image-forming systems in which a plural-element corrector system is provided on the long conjugate side of the primary mirror. This corrector system is located adjacent to the diaphragm position and is followed by the primary mirror, the latter being disposed with its concave surface directed toward the object space. More particularly, the invention relates to catadioptric objectives of very high speed and of long focal length which are capable of providing a very high image quality. The objectives according to the invention represent an improvement on and a further development of the catadioptric systems disclosed and claimed in the applicant's copending application Serial No. 40,459, now U.S. Patent No. 3,119,892, assigned to the assignee thereof.

Whereas the systems of the said copending application include a two-element corrector system on the long conjugate side of the principal mirror and possess relative apertures of the order of $f/4$, with extremely high image quality, the present invention permits a multiplication in attainable speed up to relative apertures of $f/1.5$ and beyond while achieving the highest quality of image correction. The objectives of the present invention are further characterized by a favorable dimensioning of the elements, which constitutes in practice a necessary condition for the practical construction of catadioptric systems of long focal length.

In contrast to the objective disclosed in the said copending application, that of the present invention employs a corrector system including three air-spaced lenses. These lenses accordingly enclose two air lenses, which possess a particular conformation according to the invention. It is the corrector system with these air lenses which makes possible the improved performance which characterizes the objectives of the present invention.

Figure 2:
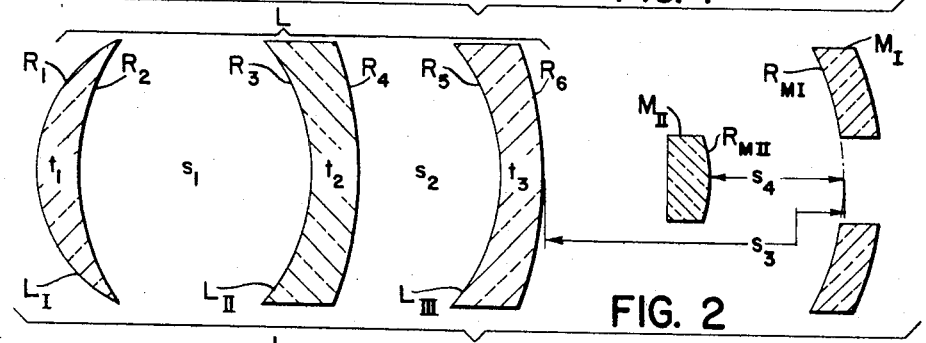
Figure 3:
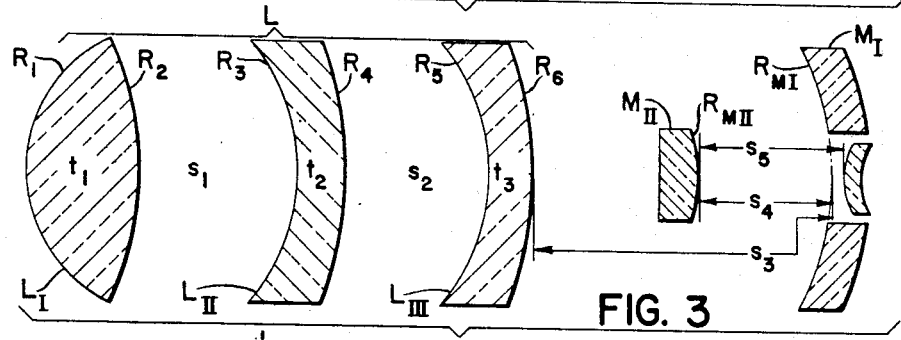

Catadioptric objectives including multi-lens corrector systems have been heretofore proposed. These proposals of the prior art have been characterized primarily by the splitting of one or more individual corrector lenses into doublets in order to diminish the chromatic aberrations of such lenses which follow from the chromatic dispersion of the glasses employed for such lenses, especially when as heretofore such lenses, have taken the form of meniscus lenses having more or less concentric surfaces, see for example British Patent No. 618,253, FIGS. 2–4.

In the systems of the prior art, these corrector lenses took the form of cemented doublets or of doublets with a small air space enclosed between the two elements of each doublet. In such constructions, small differences of radii have been given to the neighboring surfaces limiting such air spaces in order to provide additional opportunity for manipulation of the correction. Furthermore, the air lenses so provided within these corrector systems were given widely differing powers in order to attempt to achieve an improvement in image performance. In general however, and notwithstanding a large literature proposing many variations on these ideas of the prior art, a success justifying such multiple-element construction has not been achieved. Catadioptric objectives having four and even five-element corrector systems have been proposed in which the slight reduction in aberrations and consequent small improvement in overall image performance was entirely out of proportion to the complexity of the means employed and to the cost, bulk and weight of the resulting instruments.

The invention surmounts these disadvantages of the prior art by providing in the corrector system two air lenses having closely balanced powers, and by employing such a corrector system in a catadioptric objective in which the spacing of the primary mirror which forms the real image from the vertex of the rear surface of the corrector lies between 20% and 220% of the equivalent focal length of the entire objective. According to the invention, the ratio of the absolute value of the powers of these two air lenses lies between 1/10 and 10.

Introduction of such a balanced power distribution for the two air lenses makes possible a striking improvement in the image performance of the objective system as a whole. Specifically, such improved imaging properties are made possible consistently with increased relative aperture, whereas in the prior art improvement in either of these respects was accompanied by a loss in the other.

The invention will now be described in detail, together with other and further features thereof, by reference to the accompanying drawings in which FIGS. 1 to 8 are axial sections through eight objectives according to the invention.

Figure 4:
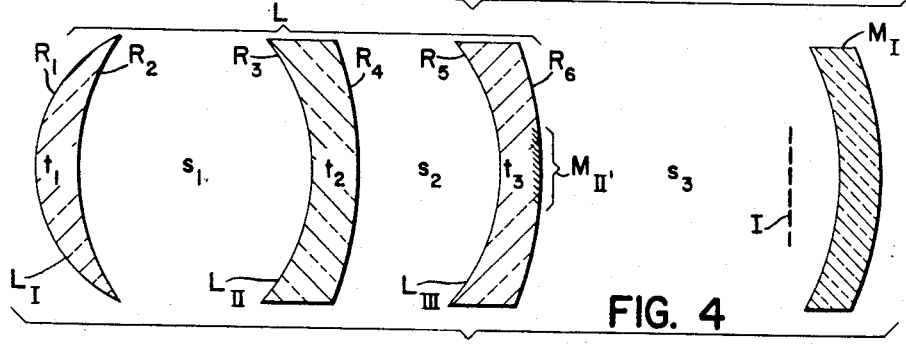

In each of FIGS. 1 to 8 the objective comprises a primary mirror $M_I$ and a three-lens corrector system collectively indicated at L. The objective of FIG. 8 includes no secondary mirror, the final image position being indicated at the dashed line I. In each of the other figures the objective includes a secondary mirror, shown as a separate element $M_{II}$ in each of FIGS. 1 to 3 and 5 to 7. In the embodiment of FIG. 4, the secondary mirror is formed by a specularly reflecting coating on a central zone of the rear surface of the rear lens $L_{III}$ of the corrector system. The embodiment of FIG. 3 further includes a lens $L_{IV}$ for correction of astigmatism across the field in the final image.

The primary mirror is, in the embodiments illustrated, a front surface concave mirror, the reflecting surface being concave toward the long conjugate side of the objective. According to the usual convention, the long conjugate side of the objective is to the left in each of FIGS. 1 to 8.

Figure 1:
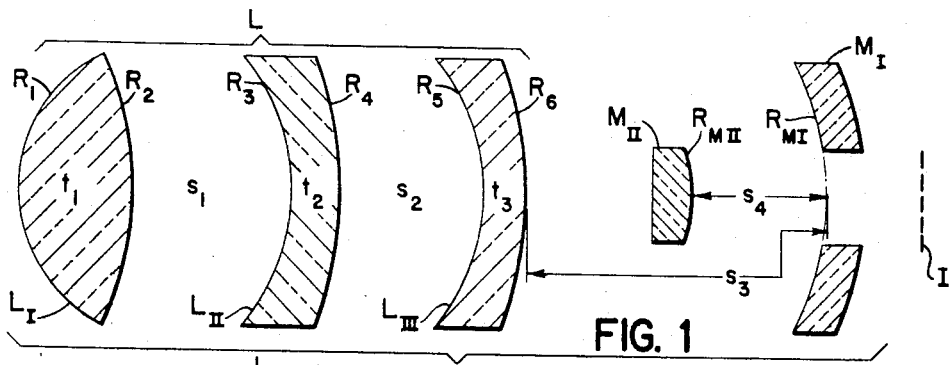

The corrector system L comprises three lenses $L_I$, $L_{II}$, and $L_{III}$, the subscripts increasing from left to right in FIG. 1. Lenses $L_I$ and $L_{II}$ define between them an air space or air lens denoted $L_{12}$, and lenses $L_{II}$ and $L_{III}$ define between them an air space or air lens denoted $L_{23}$. The outer air-glass surfaces of the lenses $L_I$, $L_{II}$, and $L_{III}$ are identified by their radii of curvature $R_1$ through $R_6$ as indicated in the figures, the subscripts increasing progressively from front to rear so that $R_1$ is the radius of $L_I$ presented to the long conjugate side of the system while $R_6$ is the radius of the face of $L_{III}$ presented to the short conjugate side of the system. The radii of the reflecting surfaces of $M_I$ and $M_{II}$ are denoted $R_{MI}$ and $R_{MII}$. The thicknesses of the lens $L_I$, $L_{II}$ and $L_{III}$ are denoted $t_1$, $t_2$ and $t_3$. The axial spacings of $L_I$ from $L_{II}$ and of $L_{II}$ from $L_{III}$ are denoted $s_1$ and $s_2$ respectively, while the spacing of $L_3$ from the primary mirror $M_I$ is denoted $s_3$, and the spacing of mirrors $M_I$ and $M_{II}$ is denoted $s_4$. $s_5$ is, for Examples 6 and 8 given below, the distance from the vertex of $M_I$ to the vertex of $L_{IV}$ whose thickness is denoted $t_4$.

The powers of the lenses $L_I$, $L_{II}$ and $L_{III}$ are denoted $L_I$ to $L_{III}$ are denoted by the symbol $\phi$, with the subscripts 1 to 6 which identify those surfaces Each of these powers is determined, in the usual way, as the ratio of the change in index of refraction at the surface in question to the radius of curvature thereof.

The powers of the lenses $L_I$, $L_{II}$ and $L_{III}$ are denoted by the symbol $\Phi$ with the appropriate subscript I, II, III. The powers of the air lenses $L_{12}$ and $L_{23}$ are denoted respectively $\Phi_{12}$ and $\Phi_{23}$. Each of these powers is taken to be the sum of the powers of the surfaces which bound the lens. Thus:

$$\Phi_I = \phi_1 + \phi_2$$
$$\Phi_{12} = \phi_2 + \phi_3$$
$$\Phi_{II} = \phi_3 + \phi_4$$
$$\Phi_{23} = \phi_4 + \phi_5$$
$$\Phi_{III} = \phi_5 + \phi_6$$

In addition, the equivalent focal length of the entire objective will be written $f$, and its reciprocal, the equivalent total power of the entire objective, will be written $\Phi$ without subscript.

In each of FIGS. 1 to 8 the corrector system L includes three lenses. In all except FIG. 8 a secondary mirror is provided, the secondary mirror being formed however in FIG. 4 by a reflecting coating formed on the center zone of the rear surface of the rearmost lens of the corrector system. The term "rear" refers to the right side of the lens or element in question. The embodiment of FIG. 3 includes a lens $L_{IV}$ for correction of astigmatism in the final image.

The corrector system includes in all embodiments three air-spaced lenses generally identified as KA, KB and KC of which KB is the middle one, also identified as $L_{II}$ in the drawings. KA and KC may be respectively the first and last lenses $L_I$ and $L_{III}$ of the corrector system, counted in the direction of propagation of light from the long to the short conjugate side of the objective, or they may be respectively the last and first $L_{III}$ and $L_I$. In FIGS. 1 to 4, 6 and 8, KA is the first corrector lens $L_I$ whereas in FIGS. 5 and 7 KA is the last corrector lens $L_{III}$. It is useful to identify the corrector lenses by this nomenclature because of certain properties which the lenses KA and KC possess in all embodiments, notwithstanding the changes in their positions. These properties are the following:

(1) The middle lens KB is a lens of unequal surface curvatures.

(2) KA is identified as that lens of the corrector system toward which the more strongly curved outer air-glass surface of KB is concave, and KC is therefore the lens of the corrector system toward which that surface of KB is convex.

(3) KA is a lens of unequal surface curvatures, and it is disposed with its more strongly curved outer air-glass surface concave toward KB.

(4) KC is also a lens of unequal surface curvatures, and it is so disposed that its more strongly curved outer air-glass surface possesses curvature of the same sign as the more strongly curved outer air-glass surface of KB.

Figure 6:
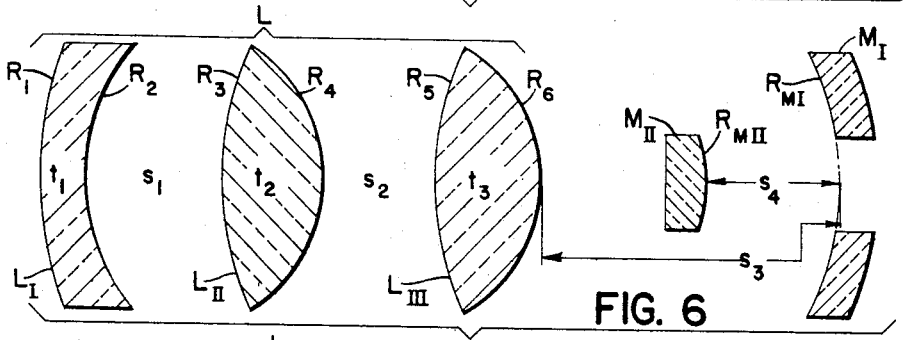

Thus in each of FIGS. 1 to 4, 6 and 8, the more strongly curved air-glass surface of the middle corrector lens KB is concave toward the left, and in these figures KA is accordingly the first corrector lens, notwithstanding the fact that in FIG. 6 this more strongly curved surface of KB is its rear surface whereas in FIGS. 1 to 4 and 8, it is the front surface of KB which is the more strongly curved.

Figure 5:
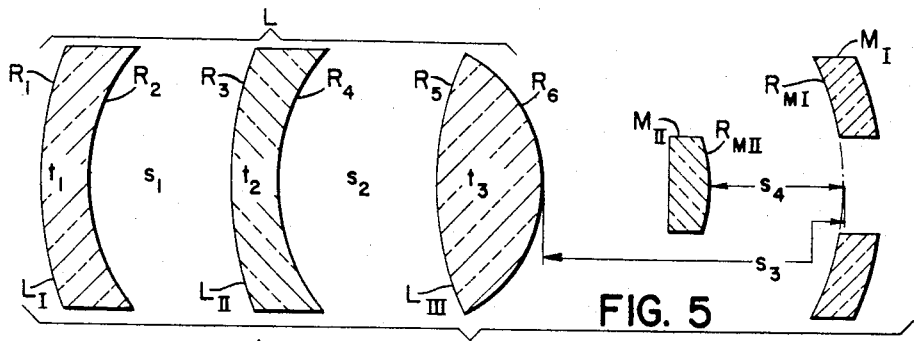
Figure 7:
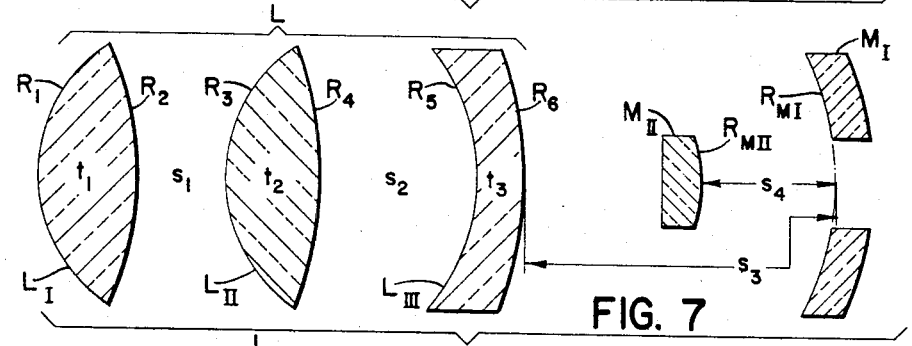
Figure 8:
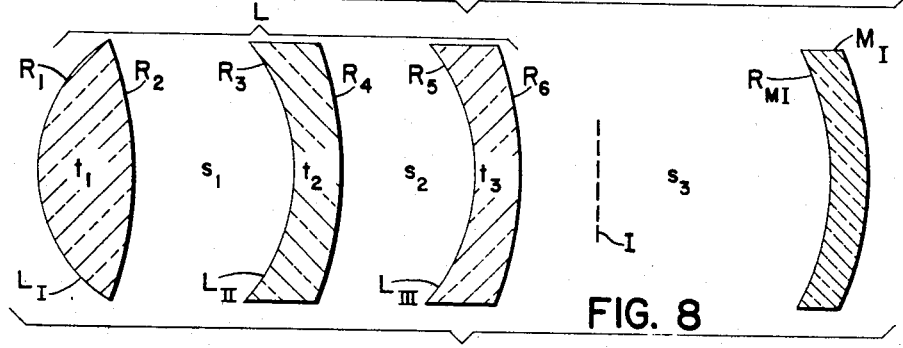

In FIGS. 5 and 7 on the other hand, the more strongly curved surface of KB is concave toward the right, and hence, notwithstanding that in FIG. 5 it is the rear and in FIG. 7 it is the front surface of KB which is thus stronger, it is in both of FIGS. 5 and 7 the rear lens of the corrector which is KA.

Similarly, although consistently with the property of KA above set forth in all figures the more strongly curved surface of KA is concave towards KB, this surface is in FIG. 1 to 4, 5 and 8 on the side of KA away from KB whereas in each of FIGS. 6 and 7 it is on the side of KA adjacent KB.

Also, in each of FIGS. 1 to 5 and 8, the more strongly curved surface of KC is on the side of KC adjacent KB while in FIGS. 6 and 7 the more strongly curved surface of KC is on the side of KC remote from KB. In all figures, the more strongly curved surface of KC has curvature of the same sign as the more strongly curved surface of KB.

According to the invention, the ratio of the algebraic sum of the powers of the adjacent surfaces of the lenses KA and KB to the algebraic sum of the powers of the adjacent surfaces of the lenses KB and KC lies in absolute value between $10^{-1}$ and 10. This ratio is identical with the ratio $\Phi_{12}/\Phi_{23}$ or with the ratio $\Phi_{23}/\Phi_{12}$, according as KA is $L_I$ or $L_{III}$. The signed value of the ratio may be either positive or negative. Since $10^{-1}$ and 10 are reciprocally related, the ratio of the algebraic sum of the powers of the adjacent surfaces of the lenses KB and KC to the algebraic sum of the powers of the adjacent surfaces of the lenses KA and KB also lies in absolute value between $10^{-1}$ and 10.

The algebraic sum of the powers of the adjacent surfaces of lenses KA and KB, constituting the power of the air lens $L_{AB}$ enclosed between lenses KA and KB, may conveniently be written $\Phi_{AB}$. The corresponding sum of the powers of the adjacent surfaces of the lenses KB and KC constituting the power of the air lens $L_{BC}$ enclosed between them, may be written $\Phi_{BC}$. Similarly as to the corrector lenses KA, KB and KC themselves, the sums of the powers of the two outer air-glass surfaces of those lenses will be written $\Phi_A$, $\Phi_B$ and $\Phi_C$. Accordingly, in FIGS. 1 to 4, 6 and 8, $\Phi_A = \Phi_I$, $\Phi_C = \Phi_{III}$, $\Phi_{12} = \Phi_{AB}$ and $\Phi_{23} = \Phi_{BC}$, whereas in FIGS. 5 and 7 $\Phi_A = \Phi_{III}$, $\Phi_C = \Phi_I$, $\Phi_{12} = \Phi_{BC}$ and $\Phi_{23} = \Phi_{AB}$. In all cases $\Phi_B = \Phi_{II}$.

Previously proposed catadioptric objectives in which the corrector includes three or more lenses, as for example the objectives of British Patent No. 618,253, have been so constructed that the ratio of the power of the air lens defined between the first and second corrector lenses to the power of the air lens defined between the second and third corrector lenses (counting from the long conjugate side of the system) is in, absolute value far below $10^{-1}$. Thus, in the Examples III and IV of that patent, the absolute value of this ratio is below 1/70 and in Example II, it is below 1/90. In that patent, the ratio of the power of the air lens between the second and third corrector lenses to the power of the air lens between the third and fourth corrector lenses lies in absolute value below the quantity 1/50.

According to a further property of the catadioptric objectives of the invention, the absolute value of the sum of the power sums $\Phi_{12}$ and $\Phi_{23}$ of the two air lenses lies between 1/7 and 10/7 times the equivalent total power $\Phi$ of the system. Fulfillment of this condition, algebraically written:

$$\Phi/7 < |\Phi_{12} + \Phi_{23}| < 10\Phi/7 \tag{2}$$

leads to an optimal useful image quality. More particularly, adherence to the criterion defined in relation (2) insures that the dioptric effect of the two air lenses is sufficiently great to achieve the desired improvement in imaging properties for the system without reaching such a level of dioptric effect as to entail an undesired increase in zonal errors such as would again limit the image quality.

It may be observed that the invention is particularly applicable to those catadioptric systems in which the spacing $s_3$ between the vertex of the rear surface of the last corrector lens $L_{III}$ and the vertex of the reflecting surface of $M_I$ is made to lie between 20% and 220% of the equivalent focal length $f$ of the systems, as is desirable to avoid the appearance of large zonal errors and also to avoid excessive physical length for the instrument. Algebraically, this property may be written:

$$0.2f < s_3 < 2.2f \tag{3}$$

Applicant has further discovered that for the achievement of the highest quality of imagery, particular attention must be given to reduction of asymmetry errors in the extra-axial portions of the field. For this reason, it is not desirable to employ, in the design of objectives according to the invention, the expedient of matching large aberration contributions of opposite signs in the various elements of the system. The invention seeks precisely to achieve optimum image quality in as uniform a manner as possible. According to the invention therefore, there is employed so far as possible a large measure of balancing out.

According to the invention, the power sums of the individual corrector lenses are so proportioned that the absolute value of the algebraic sum of the powers of the surfaces of the corrector lens KA lies between one and four times the corresponding absolute value for the corrector lens KB. Algebraically, this property may be written as follows:

$$1 < |\Phi_A/\Phi_B| < 4 \qquad (4)$$

The favorable effect of the property set out in relation (4) can be further increased by applying it not only to the power relation between the lenses KA and KB but also (or alternatively) to the power relation between the lenses KA and KC. Algebraically therefore:

$$1 < |\Phi_A/\Phi_C| < 4 \qquad (5)$$

Application of the criteria of both of relations (4) and (5) is particularly advantageous when it is desired to attain a high degree of image correction approaching that set by the diffraction limit.

In this connection it is worthy of note that in the lenses of both of Examples III and IV of British Patent No. 618,253 already referred to, the ratio of the sum of the surface powers of the front corrector element to the sum of the surface powers of the rear corrector element exceeds 5, being respectively 0.558458/0.110214 and 0.572436/0.098837. Both of these ratios exceed the value 5/1 and accordingly lie outside the range specified by the present invention.

Applicant has further found that some of the asymmetry errors can be reduced to unusually low values if, according to a further feature of the invention, the powers of the corrector elements are so proportioned that, in absolute value, the powers of the corrector element surfaces presented to the long conjugate side of the system increase with progression toward the image side of the system. Algebraically:

$$|\phi_1| < |\phi_3| < |\phi_5| \qquad (6)$$

According to a still further feature of the invention, a corresponding relation is imposed upon the powers of the rear surfaces of the corrector elements. Algebraically therefore:

$$|\phi_2| < |\phi_4| < |\phi_6| \qquad (7)$$

The wide range and flexibility of the invention will be apparent from the numerical examples now to be given. In Examples 1 to 8 and 11, the corrector system begins with a positive front element in place of the simple or compound negative meniscus customarily employed as the front element of the corrector in catadioptric systems. In most of these examples the diaphragm position lies within the corrector system. The invention, however, is not limited to such arrangements, as Example 6 demonstrates. In Example 6 in fact, the diaphragm position lies within the object space, disposed a substantial distance in front of the first corrector element $L_I$.

In these examples, to facilitate comparison among them, there is provided in addition to the primary mirror a secondary mirror $M_{II}$. With the mirror $M_{II}$ there is associated in Example 6 (FIG. 3) an image side corrector element $L_{IV}$, for which data are not given in the other examples. This element $L_{IV}$, shown for simplicity as a single lens element, is disposed between the secondary mirror $M_{II}$ and the focal plane of the objective.

The secondary mirror constitutes an independent structural element of the system. The criticality thereof to correct centering constitutes in practice often a determining condition on the achievement or non-achievement of the theoretically available image quality. The difficulty in correct centering of the secondary mirror may be reduced in the objective of the invention by providing on one face of the last corrector element $L_{III}$ a reflecting coating over the central portion of the surface thereof. This third corrector element accordingly functions refractorily as a corrector lens and also as a mirror. A result of this construction is a notable saving in weight for the system, which is of particular significance in catadioptric systems of large relative aperture and long focal length. The criterion for this form of construction is indicated algebraically as follows:

$$R_5 \equiv R_{M_{II}}$$

or $$R_6 \equiv R_{M_{II}}$$

Example 7 (FIG. 4) is an illustration of this form of construction in which the function of the secondary mirror is performed at the central part of the rear surface of $L_{III}$.

Numerical data will now be given on three examples of the invention all conforming generally to the structure illustrated in FIG. 1 of the drawings and which have been made up from glasses having indices of refraction between 1.45 and 1.90. The choice of glasses has been so made that, in the Example 1, the glass indices increase progressively with the elements beginning with the long conjugate side of the system and progressing toward the short conjugate side. Example 2 has been designed to use the same glass in all refractive elements, whereas in Example 3 the glasses are of index declining with progress from the long to the short conjugate side of the system.

The objectives according to the invention are not limited to either the visual or photographic ranges of the spectrum and may find important applications in the achievement of highly corrected images with light of other wavelengths. For use in the short wavelength range there is given Example 4 whose refractive elements are composed of lithium fluoride. In contrast, Example 5 is designed for use in the infrared, and in this example the refractive elements are made of the material known as ABC2 (a registered trademark), and also under the name Kodak Irtran 2, which possesses a high degree of transparency to infrared radiation.

Whereas the first four examples possess for the front corrector element a more or less strongly bent biconvex lens shape Examples 5 and 7 show at this position a lens of meniscus shape. The new objective as illustrated in Example 6 is designed to position the diaphragm in front of the system, outside the corrector and in the object space in front of the first corrector element. The first corrector element takes in this Example 6 the shape of a biconvex lens of unequal surface curvatures. In Example 7 the front corrector element is of meniscus shape, and in this connection it may be observed that such a shape for the front corrector element does not utilize a lens material of high index such as that employed in Example 5. On the contrary, in Example 7 all refractive elements are made of a single commercially available boron silicate crown glass.

Moreover, in Example 7 the rear surface of the third corrector element has been rendered specularly reflective in the central portion thereof. In this embodiment, therefore, the secondary mirror is a first-surface mirror subject to mechanical injury as in the case of first-surface mirrors generally. For this reason, it may be advantageous to employ as a convex secondary mirror the front face of the third corrector element, which is likewise convex toward the rear. Under these conditions the central portion of the third corrector element may possess an action similar to that of a Mangin mirror. In the case under consideration, however, the power sign of the Mangin mirror with respect to its refractive action will be opposite to that of the usual Mangin mirror.

All numerical examples have been set up for an equivalent focal length $f$ of the objective of 1,000 arbitrary units. All other linear dimensions are given as multiples of this unit. The equivalent total power $\Phi$ of the objective may accordingly be regarded as unity. The relative aperture of the examples is in the range 1/1.35 to 1/1.5 except in the case of Example 8, whose relative aperture is 1/0.99.

All of the examples to be given are provided with a convex secondary mirror $M_{II}$ to minimize curvature of the image surface. The distance X is given from the vertex of the reflecting surface of this mirror to the vertex of the rear surface $R_6$ of $L_{III}$. X is positive when this surface of $M_{II}$ lies between $R_6$ and $M_I$ and is negative when this surface of $M_{II}$ lies on the object space side of $R_6$. The back focal length is given for each example, identified by the symbol BFL, and also the powers $\phi_{MI}$ and $\phi_{MII}$ of the primary and secondary mirrors.

For each example, two tables are given. The first sets out the data of the objective in terms of the radii, thicknesses and spacings and indices of refraction and Abbe numbers of the lenses, together with the radii and positioning of the mirrors.

The second table gives the powers of the individual lens surfaces $R_1$ to $R_6$, the powers $\phi_{MI}$ and $\phi_{MII}$ of the primary and secondary mirrors, the power sums $\Phi_I$, $\Phi_{II}$, and $\Phi_{III}$ of the corrector lenses $L_I$, $L_{II}$ and $L_{III}$, the power sums $\Phi_{12}$ and $\Phi_{23}$ of the air lenses $L_{12}$ and $L_{23}$, the sum of $\Phi_{12}+\Phi_{23}$, and also the ratio $\Phi_{12}/\Phi_{23}$.

No attempt has been made in the drawings to show to scale the elements of the objectives illustrated.

The eleven numerical examples which have been given all satisfy the relation:

$$10^{-1} < |\Phi_{12}/\Phi_{23}| < 10 \qquad (1)$$

and all eleven examples further satisfy all of the conditions set out in relations (2), (3), (4), (5), (6) and (7) with the exception that Examples 9 and 10 do not meet condition (6), and that Examples 4, 9, 10 and 11 do not meet condition (7). Example 7 meets the condition in which $R_6$ equals $R_{MII}$.

While the invention has been described hereinabove in terms of a number of preferred embodiments, the invention is not limited thereto and particularly (although without limitation) it is not limited to the numerical examples which have been given. Various modifications may be made in the objectives which have been described hereinabove without departing from the scope of the invention. For example, any one or more of the lenses of the corrector system may be split into a doublet having cemented or closely air-spaced elements. The scope of the invention itself is rather set forth in the appended claims.

EXAMPLE 1

Table 1

BFL = +399.59360  
X = +208.54439

| Lens or mirror | Radii | Thickness or spacing | Index of refraction | Abbé number |
|---|---|---|---|---|
| $L_I$ (KA) | $R_1 = +2303.431$ | | | |
| | $R_2 = -4514.897$ | $t_1 = 44.77871$ | 1.5725 | 57.25 |
| | | $s_1 = 92.04512$ | | |
| $L_{II}$ (KB) | $R_3 = -1258.961$ | | | |
| | $R_4 = -2055.955$ | $t_2 = 24.87706$ | 1.6110 | 58.80 |
| | | $s_2 = 39.80330$ | | |
| $L_{III}$ (KC) | $R_5 = -945.177$ | | | |
| | $R_6 = -1283.646$ | $t_3 = 24.87706$ | 1.6370 | 55.50 |
| | | $s_3 = 526.19957$ | | |
| $M_I$ | $R_{MI} = -1120.589$ | | | |
| | | $s_4 = -317.65518$ | | |
| $M_{II}$ | $R_{MII} = -1120.589$ | | | |

Table 2.—Powers

| | |
|---|---|
| $\phi_1 = +0.248542\Phi$ | |
| $\phi_2 = +0.126802\Phi$ | $\Phi_I = \Phi_A = +0.375344\Phi$ |
| $\phi_3 = -0.485321\Phi$ | |
| $\phi_4 = +0.297186\Phi$ | $\Phi_{II} = \Phi_B = -0.188135\Phi$ |
| $\phi_5 = -0.673948\Phi$ | |
| $\phi_6 = +0.496243\Phi$ | $\Phi_{III} = \Phi_C = -0.177705\Phi$ |
| $\phi_{MI} = +1.784776\Phi$ | |
| $\phi_{MII} = -1.784776\Phi$ | |
| $\Phi_{12} = \Phi_{AB} = -0.358319\Phi$ | |
| $\Phi_{23} = \Phi_{BC} = -0.376762\Phi$ | $|\Phi_{12}/\Phi_{23}| = 0.951049$ |
| $\Phi_{12}+\Phi_{23} = -0.735081\Phi$ | |

EXAMPLE 2

Table 3

BFL = +399.23290  
X = +207.85824

| Lens or mirror | Radii | Thickness or spacing | Index of refraction | Abbé number |
|---|---|---|---|---|
| $L_I$ (KA) | $R_1 = +2128.343$ | | | |
| | $R_2 = -3904.755$ | $t_1 = 44.63128$ | 1.517 | 64.5 |
| | | $s_1 = 91.74228$ | | |
| $L_{II}$ (KB) | $R_3 = -1254.819$ | | | |
| | $R_4 = -2312.984$ | $t_2 = 24.79521$ | 1.517 | 64.5 |
| | | $s_2 = 39.67234$ | | |
| $L_{III}$ (KC) | $R_5 = -918.341$ | | | |
| | $R_6 = -1338.835$ | $t_3 = 24.79521$ | 1.517 | 64.5 |
| | | $s_3 = -524.46828$ | | |
| $M_I$ | $R_{MI} = -1116.902$ | | | |
| | | $s_4 = -316.61004$ | | |
| $M_{II}$ | $R_{MII} = -1116.902$ | | | |

Table 4.—Powers

| | |
|---|---|
| $\phi_1 = +0.242912\Phi$ | |
| $\phi_2 = +0.132403\Phi$ | $\Phi_I = \Phi_A = +0.375315\Phi$ |
| $\phi_3 = -0.412012\Phi$ | |
| $\phi_4 = +0.223521\Phi$ | $\Phi_{II} = \Phi_B = -0.188491\Phi$ |
| $\phi_5 = -0.562972\Phi$ | |
| $\phi_6 = +0.386157\Phi$ | $\Phi_{III} = \Phi_C = -0.176815\Phi$ |
| $\phi_{MI} = +1.790668\Phi$ | |
| $\phi_{MII} = -1.790668\Phi$ | $|\Phi_{12}/\Phi_{23}| = 0.823709$ |
| $\Phi_{12} = \Phi_{AB} = -0.279609\Phi$ | |
| $\Phi_{23} = \Phi_{BC} = -0.339451\Phi$ | |
| $\Phi_{12}+\Phi_{23} = -0.619060\Phi$ | |

EXAMPLE 3

Table 5

BFL = +399.57129  
X = +207.73468

| Lens or mirror | Radii | Thickness or spacing | Index of refraction | Abbé number |
|---|---|---|---|---|
| $L_I$ (KA) | $R_1 = +2554.690$ | | | |
| | $R_2 = -6789.189$ | $t_1 = 44.60485$ | 1.6968 | 56.2 |
| | | $s_1 = 91.68744$ | | |
| $L_{II}$ (KB) | $R_3 = -1254.073$ | | | |
| | $R_4 = -2139.939$ | $t_2 = 24.78047$ | 1.5725 | 57.5 |
| | | $s_2 = 39.64875$ | | |
| $L_{III}$ (KC) | $R_5 = -964.221$ | | | |
| | $R_6 = -1460.253$ | $t_3 = 24.78047$ | 1.5020 | 56.7 |
| | | $s_3 = 524.15650$ | | |
| $M_I$ | $R_{MI} = -1116.237$ | | | |
| | | $s_4 = -316.42182$ | | |
| $M_{II}$ | $R_{MII} = -1116.237$ | | | |

Table 6.—Powers

| | |
|---|---|
| $\phi_1 = +0.272753\Phi$ | $\Phi_I = \Phi_A = +0.375387\Phi$ |
| $\phi_2 = +0.102634\Phi$ | |
| $\phi_3 = -0.456513\Phi$ | $\Phi_{II} = \Phi_B = -0.188982\Phi$ |
| $\phi_4 = +0.267531\Phi$ | |
| $\phi_5 = -0.520628\Phi$ | $\Phi_{III} = \Phi_C = -0.176852\Phi$ |
| $\phi_6 = +0.343776\Phi$ | |
| $\phi_{MI} = +1.791734\Phi$ | |
| $\phi_{MII} = -1.791734\Phi$ | |
| $\Phi_{12} = \Phi_{AB} = -0.353879\Phi$ | |
| $\Phi_{23} = \Phi_{BC} = -0.253097\Phi$ | $|\Phi_{12}/\Phi_{23}| = 1.398195$ |
| $\Phi_{12}+\Phi_{23} = -0.606976\Phi$ | |

EXAMPLE 4

Table 7

BFL = +417.65871
X = +199.57333

| Lens or mirror | Radii | | Thickness or spacing | Index of refraction [1] | Material |
|---|---|---|---|---|---|
| $L_I$ (KA) | $R_1$ | =+1806.290 | $t_1$=42.85244 | 1.41784 | LiF |
| | $R_2$ | =−1613.272 | $s_1$=88.08557 | | |
| $L_{II}$ (KB) | $R_3$ | =−1204.803 | $t_2$=23.80691 | 1.41784 | LiF |
| | $R_4$ | =−2781.185 | $s_2$=38.09106 | | |
| $L_{III}$ (KC) | $R_5$ | =−887.655 | $t_3$=23.80691 | 1.41784 | LiF |
| | $R_6$ | =−1681.280 | $s_3$=503.56376 | | |
| $M_I$ | $R_{MI}$ | =−1072.384 | $s_4$=−303.99043 | | |
| $M_{II}$ | $R_{MII}$ | =−1072.384 | | | |

[1] For a wavelength of 0.2503 micron.

Table 8.—Powers

| | |
|---|---|
| $\phi_1 = +0.231325\Phi$ | $\Phi_I = \Phi_A = +0.391216\Phi$ |
| $\phi_2 = +0.0159891\Phi$ | |
| $\phi_3 = -0.346812\Phi$ | |
| $\phi_4 = +0.150238\Phi$ | $\Phi_{II} = \Phi_B = -0.196574\Phi$ |
| $\phi_5 = -0.470724\Phi$ | |
| $\phi_6 = +0.248525\Phi$ | $\Phi_{III} = \Phi_C = -0.222199\Phi$ |
| $\phi_{MI} = +1.865004\Phi$ | |
| $\phi_{MII} = -1.865004\Phi$ | |
| $\Phi_{12} = \Phi_{AB} = -0.186921\Phi$ | |
| $\phi_{23} = \Phi_{BC} = -0.320486\Phi$ | $|\Phi_{12}/\Phi_{23}| = 0.583242$ |
| $\Phi_{12}+\Phi_{23} = -0.507407\Phi$ | |

EXAMPLE 5

Table 9

BFL = +424.67950
X = +200.994245

| Lens or mirror | Radii | | Thickness or spacing | Index of refraction [1] | Material |
|---|---|---|---|---|---|
| $L_I$ (KA) | $R_1$ | =+2871.426 | $t_1$=43.157538 | 2.1983 | ABC 2 |
| | $R_2$ | =+38671.704 | $s_1$=88.712717 | | |
| $L_{II}$ (KB) | $R_3$ | =−1213.381 | $t_2$=23.976410 | 2.1983 | ABC 2 |
| | $R_4$ | =−1519.418 | $s_2$=38.362256 | | |
| $L_{III}$ (KC) | $R_5$ | =−1095.814 | $t_3$=23.976410 | 2.1983 | ABC 2 |
| | $R_6$ | =−1390.743 | $s_3$=507.49024 | | |
| $M_I$ | $R_{MI}$ | =−1080.018 | $s_4$=−306.154779 | | |
| $M_{II}$ | $R_{MII}$ | =−1080.018 | | | |

[1] For a wavelength of 10.0 microns.

Table 10.—Powers

| | |
|---|---|
| $\phi_1 = +0.417319\Phi$ | $\Phi_I = \Phi_A = +0.386332\Phi$ |
| $\phi_2 = -0.030987\Phi$ | |
| $\phi_3 = -0.987571\Phi$ | $\Phi_{II} = \Phi_B = -0.198914\Phi$ |
| $\phi_4 = +0.788657\Phi$ | |
| $\phi_5 = -1.093525\Phi$ | $\Phi_{III} = \Phi_C = -0.231899\Phi$ |
| $\phi_6 = +0.861626\Phi$ | |
| $\phi_{MI} = +1.851820\Phi$ | |
| $\phi_{MII} = -1.851820\Phi$ | |
| $\Phi_{12} = \Phi_{AB} = -1.018558\Phi$ | |
| $\Phi_{23} = \Phi_{BC} = -0.304868\Phi$ | $|\Phi_{12}/\Phi_{23}| = 3.34098$. |
| $\Phi_{12}+\Phi_{23} = 1.323426\Phi$ | |

EXAMPLE 6

Table 11

BFL = +24.61422
X = +216.15423

| Lens or mirror | Radii | | Thickness or spacing | Index of refraction | Abbé number |
|---|---|---|---|---|---|
| $L_I$ (KA) | $R_1$ | =+2213.2904 | $t_1$=46.41269 | 1.5170 | 64.5 |
| | $R_2$ | =−4060.6004 | $s_1$=−95.40387 | | |
| $L_{II}$ (KB) | $R_3$ | =−1304.9004 | $t_2$=25.78483 | 1.5170 | 64.5 |
| | $R_4$ | =−2405.3032 | $s_2$=41.25573 | | |
| $L_{III}$ (KC) | $R_5$ | =−954.9940 | $t_3$=25.78483 | 1.5170 | 64.5 |
| | $R_6$ | =−1392.2690 | $s_3$=545.40072 | | |
| $M_I$ | $R_{MI}$ | =−1161.4793 | $s_4$=−329.24649 | | |
| $M_{II}$ | $R_{MII}$ | =−1161.4793 | $s_5$=376.35538 | | |
| $L_{IV}$ | $R_7$ | =+171.20265 | $t_4$=17.94624 | 1.5170 | 64.5 |
| | $R_8$ | =+171.20265 | | | |

In this example the diaphragm position is 80.08 units to the left of $R_1$.

Table 12.—Powers

| | |
|---|---|
| $\phi_1 = +0.233589\Phi$ | $\Phi_I = \Phi_A = +0.360910\Phi$ |
| $\phi_2 = +0.127321\Phi$ | |
| $\phi_3 = -0.396199\Phi$ | $\Phi_{II} = \Phi_B = -0.181257\Phi$ |
| $\phi_4 = +0.214942\Phi$ | |
| $\phi_5 = -0.541365\Phi$ | $\Phi_{III} = \Phi_C = -0.170029\Phi$ |
| $\phi_6 = +0.371336\Phi$ | |
| $\phi_{MI} = +1.721942\Phi$ | |
| $\phi_{MII} = -1.721942\Phi$ | |
| $\phi_7 = +3.019813\Phi$ | |
| $\phi_8 = -3.019813\Phi$ | |
| $\Phi_{12} = \Phi_{AB} = -0.268878\Phi$ | |
| $\Phi_{23} = \Phi_{BC} = -0.326423\Phi$ | $|\Phi_{12}/\Phi_{23}| = 0.823710$ |
| $\Phi_{12} + \Phi_{23} = -0.595301\Phi$ | |

EXAMPLE 7

Table 13

BFL = +340.9576
X = 0

| Lens or mirror | Radii | Thickness or spacing | Index of refraction | Abbé number |
|---|---|---|---|---|
| $L_I$ (KA) | $R_1 = +1627.178$ | $t_1 = 24.89583$ | 1.5170 | 64.5 |
| | $R_2 = +67285.695$ | $s_1 = 112.03124$ | | |
| $L_{II}$ (KB) | $R_3 = -1258.636$ | $t_2 = 24.89583$ | 1.5170 | 64.5 |
| | $R_4 = -2271.519$ | $s_2 = 32.36458$ | | |
| $L_{III}$ (KC) | $R_5 = -922.751$ | $t_3 = 24.89583$ | 1.5170 | 64.5 |
| | $R_6 = -1244.792$ | $s_3 = 402.69005$ | | |
| $M_I$ | $R_{MI} = -1244.792$ | $s_4 = -402.69005$ | | |
| $M_{II}$ | $R_{MII} = -1244.792$ | | | |

Table 14.—Powers

| | |
|---|---|
| $\phi_1 = +0.317728\Phi$ | $\Phi_I = \Phi_A = +0.310044\Phi$ |
| $\phi_2 = -0.007684\Phi$ | |
| $\phi_3 = -0.410762\Phi$ | |
| $\phi_4 = +0.227601\Phi$ | $\Phi_{II} = \Phi_B = -0.183161\Phi$ |
| $\phi_5 = -0.560281\Phi$ | |
| $\phi_6 = +0.415330\Phi$ | $\Phi_{III} = \Phi_C = -0.144951\Phi$ |
| $\phi_{MI} = +1.606694\Phi$ | |
| $\phi_{MII} = -1.606694\Phi$ | |
| $\Phi_{12} = \Phi_{AB} = -0.418446\Phi$ | |
| $\Phi_{23} = \Phi_{BC} = -0.332680\Phi$ | $|\Phi_{12}/\Phi_{23}| = 1.257803$ |
| $\Phi_{12} + \Phi_{23} = -0.751126\Phi$ | |

EXAMPLE 8

Table 15

BFL = +57.05032
X = +185.790

| Lens or mirror | Radii | Thickness or spacing | Index of refraction | Abbé number |
|---|---|---|---|---|
| $L_I$ (KA) | $R_1 = +1850.909$ | $t_1 = 91.341$ | 1.517 | 64.5 |
| | $R_2 = -5860.564$ | $s_1 = 104.050$ | | |
| $L_{II}$ (KB) | $R_3 = -1275.347$ | $t_2 = 13.682$ | 1.517 | 64.5 |
| | $R_4 = -2367.819$ | $s_2 = 83.567$ | | |
| $L_{III}$ (KC) | $R_5 = -1016.523$ | $t_3 = 25.070$ | 1.517 | 64.5 |
| | $R_6 = -1671.415$ | $s_3 = 508.825$ | | |
| $M_I$ | $R_{MI} = -1136.820$ | $s_4 = -323.035$ | | |
| $M_{II}$ | $R_{MII} = -1136.820$ | $s_5 = 344.373$ | | |
| | $R_7 = +167.756$ | | | |
| $L_{IV}$ | $R_8 = +167.756$ | | 1.517 | 64.5 |

Table 16.—Powers

| | |
|---|---|
| $\phi_1 = +0.279322\Phi$ | $\Phi_I = \Phi_A = +0.367539\Phi$ |
| $\phi_2 = +0.088217\Phi$ | |
| $\phi_3 = -0.405380\Phi$ | $\Phi_{II} = \Phi_B = -0.187036\Phi$ |
| $\phi_4 = +0.218344\Phi$ | |
| $\phi_5 = -0.508596\Phi$ | $\Phi_{III} = \Phi_C = -0.199277\Phi$ |
| $\phi_6 = +0.309319\Phi$ | |
| $\phi_{MI} = +1.759292\Phi$ | |
| $\phi_{MII} = -1.759292\Phi$ | |
| $\phi_7 = +3.081857\Phi$ | |
| $\phi_8 = -3.081857\Phi$ | |
| $\Phi_{12} = \Phi_{AB} = -0.317163\Phi$ | |
| $\Phi_{23} = \Phi_{BC} = -0.290252\Phi$ | |
| $\Phi_{12} + \Phi_{23} = -0.607415\Phi$ | $|\Phi_{12}/\Phi_{23}| = 1.092716$ |

EXAMPLE 9

Table 17

BFL = +417.239115
X = +1479.960

| Lens or mirror | Radii | Thickness or spacing | Index of refraction[1] | Abbé number |
|---|---|---|---|---|
| $L_I$ (KC) | $R_1 = +1333.264$ | $t_1 = 25.867$ | 1.517 | 64.5 |
| | $R_2 = +930.947$ | $s_1 = 51.707$ | | |
| $L_{II}$ (KB) | $R_3 = +2209.141$ | $t_2 = 25.867$ | 1.517 | 64.5 |
| | $R_4 = +1249.697$ | $s_2 = 95.667$ | | |
| $L_{III}$ (KA) | $R_5 = +4124.071$ | $t_3 = 51.707$ | 1.517 | 64.5 |
| | $R_6 = -2205.352$ | $s_3 = 1812.421$ | | |
| $M_I$ | $R_{MI} = -1173.225$ | $s_4 = 332.461$ | | |
| $M_{II}$ | $R_{MII} = -1173.225$ | | | |

Table 18.—Powers

| | |
|---|---|
| $\phi_1 = +0.387770\Phi$ | |
| $\phi_2 = -0.555348\Phi$ | $\Phi_I = \Phi_C = -0.167578\Phi$ |
| $\phi_3 = +0.234027\Phi$ | |
| $\phi_4 = -0.413700\Phi$ | $\Phi_{II} = \Phi_B = -0.179673\Phi$ |
| $\phi_5 = +0.125361\Phi$ | |
| $\phi_6 = +0.234430\Phi$ | $\Phi_{III} = \Phi_A = +0.359791\Phi$ |
| $\phi_{MI} = +1.704702\Phi$ | |
| $\phi_{MII} = -1.704702\Phi$ | |
| $\Phi_{12} = \Phi_{BC} = -0.321321\Phi$ | |
| $\Phi_{23} = \Phi_{AB} = -0.288339\Phi$ | $|\Phi_{12}/\Phi_{23}| = 1.114386$ |
| $\Phi_{12} + \Phi_{23} = -0.609660\Phi$ | |

EXAMPLE 10

Table 19

BFL = +480.39019
X = +1414.506

| Lens or mirror | Radii | Thickness or spacing | Index of refraction | Abbé number |
|---|---|---|---|---|
| $L_I$ (KA) | $R_1 = +2664.326$ | $t_1 = 23.980$ | 1.5725 | 57.25 |
| | $R_2 = +966.148$ | $s_1 = 243.065$ | | |
| $L_{II}$ (KB) | $R_3 = +10336.106$ | $t_2 = 29.105$ | 1.611 | 58.80 |
| | $R_4 = -5526.311$ | $s_2 = 6.924$ | | |
| $L_{III}$ (KC) | $R_5 = +10774.516$ | $t_3 = 29.585$ | 1.637 | 55.50 |
| | $R_6 = -5762.152$ | $s_3 = 1767.009$ | | |
| $M_I$ | $R_{MI} = -1234.971$ | $s_4 = -352.503$ | | |
| $M_{II}$ | $R_{MII} = -1234.971$ | | | |

Table 20.—Powers

| | |
|---|---|
| $\phi_1 = +0.214876\Phi$ | |
| $\phi_2 = -0.592559\Phi$ | $\Phi_I = \Phi_A = -0.377683\Phi$ |
| $\phi_3 = +0.059113\Phi$ | |
| $\phi_4 = +0.110562\Phi$ | $\Phi_{II} = \Phi_B = +0.169675\Phi$ |
| $\phi_5 = +0.059121\Phi$ | |
| $\phi_6 = +0.110549\Phi$ | $\Phi_{III} = \Phi_C = +0.169670\Phi$ |
| $\phi_{MI} = +1.607754\Phi$ | |
| $\phi_{MII} = -1.607754\Phi$ | |
| $\Phi_{12} = \Phi_{AB} = -0.533446\Phi$ | |
| $\Phi_{23} = \Phi_{BC} = +0.169683\Phi$ | $|\Phi_{12}/\Phi_{23}| = 3.143780$ |
| $\Phi_{12} + \Phi_{23} = -0.363763\Phi$ | |

EXAMPLE 11

Table 21

BFL = +412.95626
X = +375.176

| Lens or mirror | Radii | Thickness or spacing | Index of refraction | Abbé number |
|---|---|---|---|---|
| $L_I$ (KC) | $R_1 = +3998.893$ | $t_1 = 23.924$ | 1.502 | 56.7 |
| | $R_2 = -7477.527$ | $s_1 = 6.090$ | | |
| $L_{II}$ (KB) | $R_3 = +4559.525$ | $t_2 = 25.031$ | 1.5725 | 57.5 |
| | $R_4 = -8527.928$ | $s_2 = 89.751$ | | |
| $L_{III}$ (KA) | $R_5 = -1007.012$ | $t_3 = 25.643$ | 1.6968 | 56.2 |
| | $R_6 = -2358.361$ | $s_3 = 685.575$ | | |
| $M_I$ | $R_{MI} = -1095.405$ | $s_4 = 310.399$ | | |
| $M_{II}$ | $R_{MII} = -1095.405$ | | | |

Table 22.—Powers

| | |
|---|---|
| $\phi_1 = +0.125535\Phi$ | $\Phi_I = \Phi_C = +0.192669\Phi$ |
| $\phi_2 = +0.067134\Phi$ | |
| $\phi_3 = +0.125561\Phi$ | |
| $\phi_4 = +0.067132\Phi$ | $\Phi_{II} = \Phi_B = +0.192693\Phi$ |
| $\phi_5 = -0.691947\Phi$ | |
| $\phi_6 = +0.295459\Phi$ | $\Phi_{III} = \Phi_A = -0.396488\Phi$ |
| $\phi_{MI} = +1.825808\Phi$ | |
| $\phi_{MII} = -1.825808\Phi$ | |
| $\Phi_{12} = \Phi_{BC} = +0.192695\Phi$ | |
| $\Phi_{23} = \Phi_{AB} = -0.624815\Phi$ | $\Phi_{12}/\Phi_{23} = -0.308403$ |
| $\Phi_{12} + \Phi_{23} = -0.432120\Phi$ | |

I claim:

1. A catadioptric objective for producing images of distant objects, said objective comprising a concave mirror and a corrector system including three air-spaced lenses disposed coaxially to each other on the concave side of said mirror, said lenses defining two air spaces, the spacing of the mirror from the adjacent surface of the nearest one of said lenses lying between 0.2 and 2.2 times the equivalent focal length of the objective, said spacing being substantially less than the back focal length of said corrector system, each of the lenses of said corrector system having unequal surface curvatures, the lens of said system toward which the more strongly curved surface of the middle one of said lenses is concave having its more strongly curved surface concave toward said middle lens, the more strongly curved surface of the third of said lenses having curvature of the same sign as the more strongly curved surface of the middle one of said lenses, and the absolute value of the ratio of the sums of the powers of the surfaces of said lenses bounding said two air spaces lying between 0.25 and 4.

2. A catadioptric objective according to claim 1 in which the absolute value of the sum of the powers of the surfaces limiting said air spaces lies between one seventh and ten sevenths times the equivalent power of the objective.

3. A catadioptric objective according to claim 2 in which the absolute value of the ratio of the sum of the surface powers of the lens on the concave side of the more strongly curved surface of said middle lens to the sum of the surface powers of said middle lens lies between one and four.

4. A catadioptric objective according to claim 2 in which the absolute value of the ratio of the sum of the surface powers of the lens on the concave side of the more strongly curved surface of said middle lens to the sum of the surface powers of the third of said lenses lies between one and four.

5. A catadioptric objective according to claim 3 in which the absolute values of the powers of the surfaces of said lenses remote from said mirror increase progressively from lens to lens toward the mirror.

6. A catadioptric objective according to claim 5 in which the absolute values of the powers of the surfaces of said lenses adjacent said mirror increase progressively from lens to lens toward the mirror.

7. A catadioptric objective according to claim 1 in which the one of said lenses nearest said mirror bears a specularly reflecting coating over a central zone thereof to function as a secondary mirror.

8. A catadioptric objective according to claim 1 in which the rear surface of the one of said lenses nearest the primary mirror bears a specularly reflecting coating over a central zone thereof to act as a secondary mirror.

References Cited by the Examiner
UNITED STATES PATENTS

| | | | |
|---|---|---|---|
| 2,509,554 | 5/1950 | Wynne | 88—57 |
| 2,701,983 | 2/1955 | Back et al. | 88—57 |
| 2,742,817 | 4/1956 | Altman | 88—57 |
| 3,001,446 | 9/1961 | Bouwers et al. | 88—57 |

DAVID H. RUBIN, *Primary Examiner.*

EMIL G. ANDERSON, FREDERICK M. STRADER,
*Examiners.*